United States Patent [19]

Takahashi

[11] Patent Number: 4,469,225

[45] Date of Patent: Sep. 4, 1984

[54] TAPE CASSETTE CASES WITH LOCKING MECHANISM

[75] Inventor: Kenji Takahashi, Tagajo, Japan

[73] Assignee: Sony Corporation, Tokyo, Japan

[21] Appl. No.: 448,409

[22] Filed: Dec. 9, 1982

[30] Foreign Application Priority Data

Dec. 15, 1981 [JP] Japan ............................... 56-187038

[51] Int. Cl.$^3$ .......................................... B65D 85/672
[52] U.S. Cl. ...................................... 206/387; 70/63;
206/1.5; 220/326; 292/302; 292/DIG. 48
[58] Field of Search ................ 70/63, 67, 68; 206/1.5,
206/387, 509; 220/315, 324, 326; 292/150, 152,
156, 162, 175, 288, 302, 305, DIG. 48, DIG. 50;
312/8, 9, 10; 211/49.1

[56] References Cited

U.S. PATENT DOCUMENTS

| | | | |
|---|---|---|---|
| 1,883,481 | 10/1932 | Baum | 292/DIG. 50 |
| 1,954,739 | 4/1934 | Lyons | 292/305 |
| 2,685,970 | 8/1954 | Springer et al. | 211/49.1 |
| 2,735,552 | 2/1956 | Shnitzler et al. | 211/49.1 |
| 2,825,466 | 3/1958 | Shnitzler et al. | 211/49.1 |
| 3,117,532 | 1/1964 | Moorhead | 292/150 |
| 3,837,692 | 9/1974 | Ayers et al. | 70/63 |
| 3,933,381 | 1/1976 | Schurman | 292/DIG. 48 |
| 4,048,051 | 9/1977 | Gretz | 206/1.5 |
| 4,078,657 | 3/1978 | Schurman | 206/387 |
| 4,153,178 | 5/1979 | Weavers | 206/387 |
| 4,177,896 | 12/1979 | Weavers et al. | 206/387 |
| 4,211,337 | 7/1980 | Weavers et al. | 206/387 |
| 4,231,474 | 11/1980 | Takahashi | 206/387 |
| 4,239,269 | 12/1980 | Chiang | 292/175 |

FOREIGN PATENT DOCUMENTS 2339041 8/1977 France .
2022555 12/1979 United Kingdom .

Primary Examiner—William T. Dixson, Jr.
Assistant Examiner—Jimmy G. Foster
Attorney, Agent, or Firm—Lewis H. Eslinger; Alvin Sinderbrand

[57] ABSTRACT

A tape cassette case has a main wall, a cover wall, with peripheral walls which extend from each, and a hinge formed from a back wall to connect the main wall to the cover wall. A locking means is provided and comprises a slider member slidably mounted onto a support member that forms part of one peripheral wall. The locking means is biased away from the one peripheral wall in a direction perpendicular to the sliding direction of the slider member by coil springs and pins. There are two projecting members projecting from the other peripheral wall, so that when the case is closed, the slider member may be slid in one direction to engage with the projecting members, thereby locking the main wall and the cover wall together, when the slider member is moved in the opposite direction the slider member is disengaged from the projecting portions, thereby allowing the case to be opened. The locking means is provided with projections and corresponding cut-outs so that the slider member may only be slid when it is pushed in against the force of the biasing springs. Additional locking means are provided that comprise rectangular finger portions and corresponding apertures. The outside surfaces of the main wall and the cover wall are provided with ridges and recesses, respectively, so that a plurality of tape cassette cases may be stacked. Guide members are also provided for cooperating with the rails of a stacking frame to facilitate stacking and securing several cases together.

12 Claims, 8 Drawing Figures

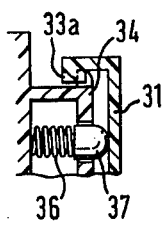
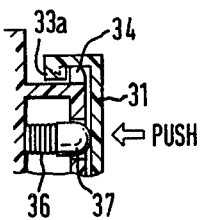
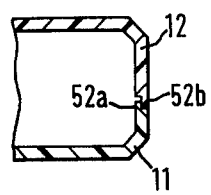
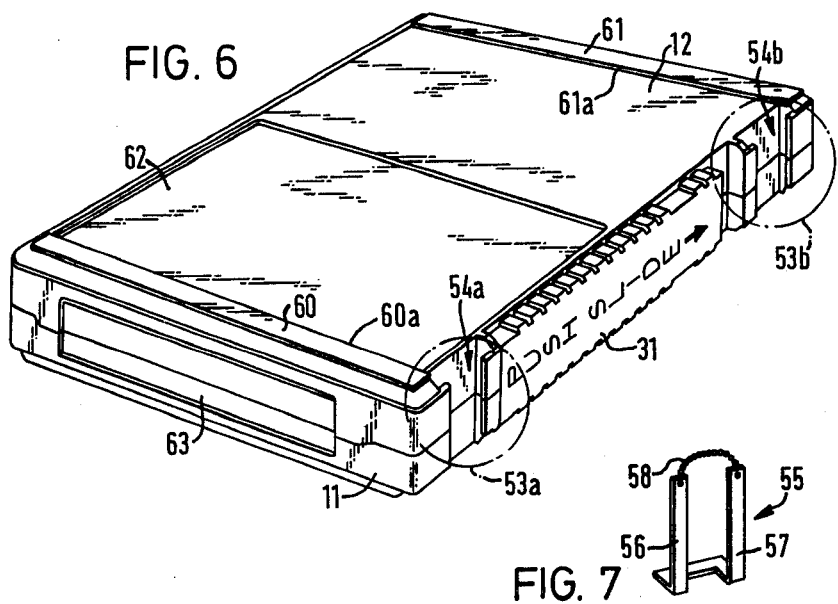

TAPE CASSETTE CASES WITH LOCKING MECHANISM

BACKGROUND OF THE INVENTION

1. Field of the Invention

This invention relates generally to tape cassette cases and, specifically, relates to a tape cassette latch mechanism that prevents the case from inadvertent openings.

2. Description of the Prior Art

Tape cassette cases for storing cassettes so as to protect the cassettes from dust and humidity are known, for example, from UK Patent Specification No. 2 022 555A and having a common assignee herewith, the case described therein being illustrated in FIG. 1 of the accompanying drawings. In FIG. 1, a cassette case comprises main wall 1 and cover wall 2, hingedly connected by end wall 3. Secured to main wall 1 is an identical pair of reel lock members 4 and 5 that engage the reels of the cassette, when it is placed into the case, so that unwinding of the cassette reels does not occur. The case, which is made from a resilient material, is provided with a pair of releasable locking arrangements comprising a pair of rectangular assemblies 6 mounted on peripheral wall 7 extending from cover wall 2, and a pair of corresponding recesses 8 formed in peripheral wall 9 extending from main wall 1. Each of the rectangular assemblies 6 has a respective protrusion 6a and 6b formed thereon, and each of the recesses 8 has a respective aperture 8a and 8b corresponding to protrusions 6a and 6b, respectively. Apertures 8a and 8b are arranged to receive protrusions 6a and 6b, so that, when the case is in the process of being closed, protrusions 6a and 6b slide over recesses 8 in peripheral wall 9 and become inserted into apertures 8a and 8b, thereby locking the case. The case may be unlocked by exerting an opposing separating force on main wall 1 and cover wall 2 to urge protrusions 6a and 6b out of apertures 8a and 8b.

Peripheral walls 7 and 9 extend from main wall 1 and cover wall 2, respectively, so that, when the case is closed, peripheral wall 7 slides over the outwardly facing surface peripheral wall 9, so as to provide a seal to prevent dust and other particles from entering the closed case and being deposited on the tape housed in the cassette that has been placed in the case.

The above-described tape cassette case and other prior art cases have the disadvantage that the locking arrangement for keeping the case closed is not sufficiently secure to prevent the case from opening by accident, thereby, putting the safety of the cassette at risk. Furthermore, the locking arrangement of the above-described case is only operable if peripheral walls 7 and 9 of the case are made from a material sufficiently flexible and resilient to permit the members of the above-mentioned locking arrangement to be flexibly repositioned with respect to each other, thus imposing a constraint on the strength of the case, as well as a constraint on the security of the locking arrangement itself. Due to the required inherent flexibility of peripheral walls 7 and 9, and the fact that they overlap when the case is closed, small gaps exist in what is intended to be a seal formed between them, the gaps being sufficiently large for dust and humidity to enter the closed case.

Furthermore, such prior art cassette cases are not provided with facilities that enable them to be stacked one on the others conveniently and securely, therefore, problems exist in the safe transportation of a number of such cases, while ensuring that cassettes stored within them are protected.

SUMMARY OF THE INVENTION

It is an object of the present invention to provide a tape cassette case having a sliding lock mechanism.

It is another object of the present invention to provide a tape cassette case having a sliding lock mechanism that is slidable into a locked or unlocked state only when it is first pushed perpendicularly to the sliding direction.

It is still another object of the present invention to provide a tape cassette case that has facilities enabling it to be securely stacked on top of another such cassette case.

It is another object of the present invention to provide a tape cassette case having means for receiving apparatus that enables a plurality of tape cassette cases to be transported without relative movement therebetween.

The present invention provides a tape cassette case suitable for storing a cassette housing a tape that comprises: a main wall and a cover wall each having a periphery, and peripheral walls, which extend from at least part of the periphery of each of the main and cover walls, the walls being closable to form an enclosure defined by the main walls, the cover wall and the peripheral walls; a hinge means forming a back wall, and connecting a part of the periphery of the main wall to part of the periphery of the cover wall; a locking means is disposed on the peripheral walls of the main wall and the cover wall at a location opposite to the hinge means, the locking means comprising a slider member that is slidably mounted on one peripheral wall and at least one projecting member projecting from the other peripheral wall, so that, when the case is closed, the slider member can be moved in one sliding direction to engage with the projecting member, thereby locking the main wall and the cover wall together, the slider member being slidable in a direction opposite to the one sliding direction to disengage the slider member from the projecting portion, thereby allowing the case to be opened.

A tape cassette case embodying this invention, as described hereinbelow, is suitable for transporting a video tape cassette, for example, a Sony U-matic cassette. The sliding lock mechanism provides secure positive locking, while enabling the case to be strongly constructed. Means may also be provided for enabling a plurality of cases to be safely stacked, one on top of the other, thereby simplifying the transportation of a plurality of tape cassette cases.

The slider member of the sliding lock mechanism may be biased away from the one peripheral wall by a spring means, for example, a plurality of coiled springs, situated between the slider member and the one peripheral wall. The sliding lock mechanism is provided with a lock securing means, whereby the slider member can only be moved transversely, in order to engage or disengage the projecting member, when it is pushed in a direction caused by the springs opposite to the biasing direction. Hence, when the case is either open or closed, the slider member is prevented from sliding by the lock securing means.

The main wall of the cassette case may be provided with a supply-reel lock member and a take-up reel lock member, both extending from one face thereof, the supply reel lock members being arranged to engage corresponding hub members of the reels of the cassette, when the cassette is placed into the case. The slider member of the latch mechanism may be mounted on a support member that forms part of the one peripheral wall, the slider member being constrained to be slidable on the support member by means of a pair of flanges co-operating with the support member, the flanges forming an integral part of, and extending along the periphery of, the slider member in the sliding direction.

On the peripheral walls of the main wall and the cover wall, for example, at a location in the vicinity of the locking means, there may be provided an additional locking means comprising a rectangular finger projecting from one of the peripheral walls and having a projection formed thereon, the finger sliding over a recessed portion in the other peripheral wall as the case is closed, so that the projection of the finger is inserted into an aperture in the recessed portion upon closing the case.

Embodiments of this invention may also be provided with a pair of guide members formed as slots through which rail members may pass, thus providing means for securing a plurality of cassette cases together in stacked relationship for transportation. The guide slots may be formed in the peripheral walls of both the main wall and the cover wall, and are located, for example, on either side of and adjacent to the locking means. Furthermore, edges of the peripheral walls of the case are provided with shoulders, so that, when the main wall and the cover wall are brought together on closing the case, the shoulder of the peripheral wall of the main wall interlocks with that of the cover wall, thus providing a seal for preventing dust and humidity from entering the case.

Upper and lower outside surfaces of the main and cover walls may be provided with recesses and corresponding ridges, located so that when the cases are stacked on top of one another, the recesses and/or ridges of, say, the outside surface of the main wall of one case interlock with the recesses and/or ridges of the outside surface of the cover wall of the case being stacked.

The above and other objects, features, and advantages of this invention will be apparent from the following detailed description of illustrative embodiments, which is to be read in connection with the accompanying drawings.

BRIEF DESCRIPTION OF THE DRAWINGS

FIG. 4A and FIG. 4B are sectional views showing a lock securing means, in which a post of the slider member is engaged and disengaged, respectively, with a support member;

FIG. 5 is a sectional view showing interlocking of shoulders provided on peripheral walls of the case;

FIG. 6 is a perspective view of the case in a closed position, showing guide members or slots that provide a means for securing a plurality of cases together; and FIG. 7 is a perspective view of a transporting apparatus, which is insertable into the guide members or slots, and provides a means for transporting one or more tape cassette cases.

DESCRIPTION OF THE PREFERRED EMBODIMENTS

Figure 2:
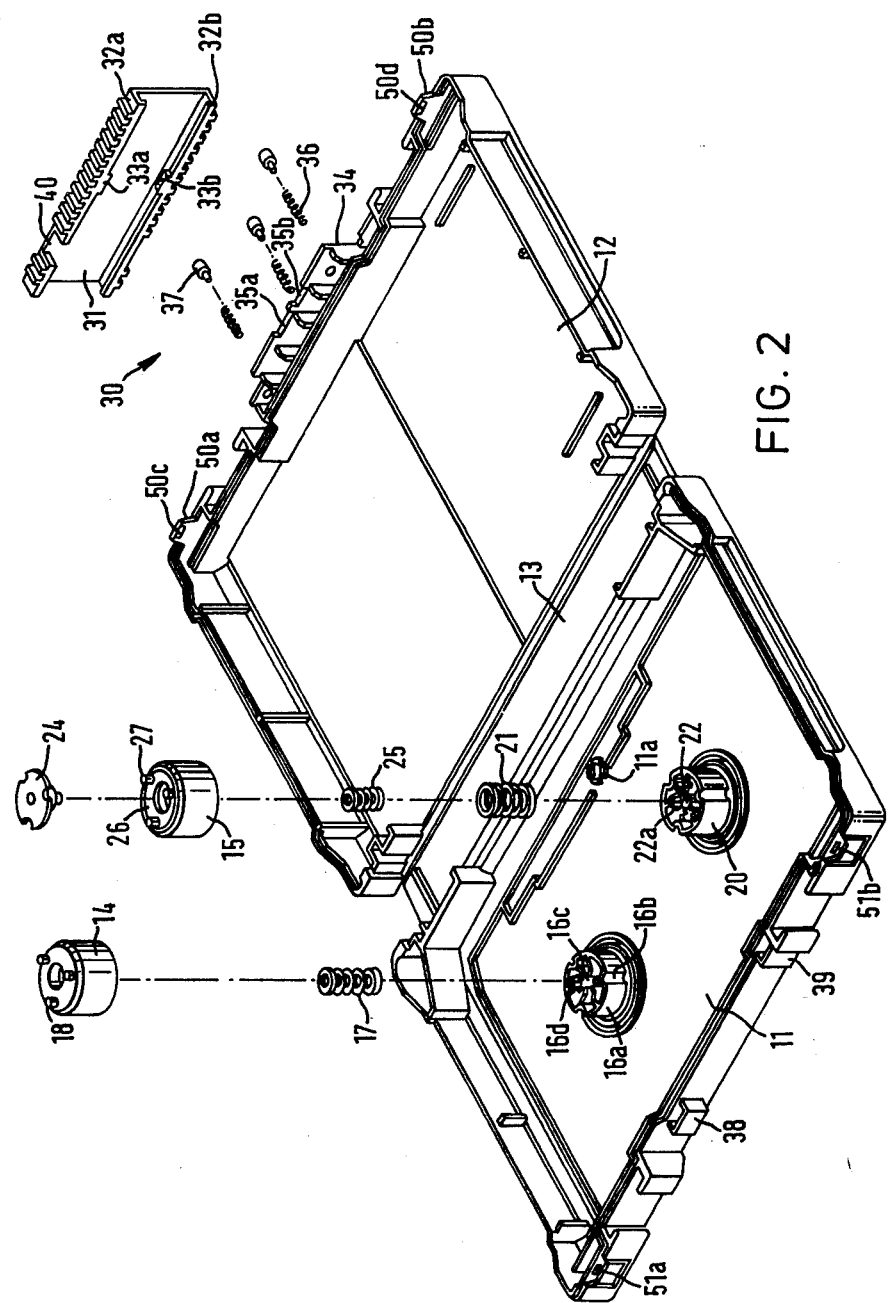
FIG. 2 is a perspective view of a tape cassette case, embodying this invention, shown in an opened position and showing an exploded view of two reel lock members and a locking means.

Referring to FIG. 2, a tape cassette case for storing a tape cassette is shown in an open position, the case having main wall 11 and cover wall 12 hingedly connected by back wall 13. Main wall 11, cover wall 12, and back wall 13 are, for example, moulded integrally from a plastics material. A hinge at each junction between both main wall 11, cover wall 12, and back wall 13 is in form of a valley or groove formed in the plastics material, and each hinge comprises two bevelled edges at an angle of about 45° relative to the respective walls, which can be brought into mating relation when the case is closed. An arrangement of projections 11a, formed in main wall 11, provide a means for receiving and supporting an aperture formed in the plug (not shown). The plug is suitable for insertion into a cassette where its presence prevents the cassette from inadvertently being erased or additional material being recorded over the original material.

Take-up reel lock member 14 and supply-reel lock member 15 extend upwardly from main wall 11, and are arranged so that when a cassette is placed into case, the take-up reel lock member 14 engages with the take-up reel of the cassette, and supply-reel lock member 15 engages with the supply-reel of the cassette. Lock member 14 prevents lateral movement of the cassette within the case, and prevents the take-up reel from freely rotating. If the cassette is a video cassette, it is important that the tape contained therein is prevented from spilling out from the cassette housing. The lock member 14, which is similar to a hub engaging member as described in UK Pat. No. 2 022 555, will be briefly described below. Lock member 14 comprises support member 16a secured to main wall 11. Lock member 14 is mounted over support member 16a so that it is slidable in a vertical direction but is prevented from rotating about support member 16a by means of projections (not shown) projecting from the inner circumferential surface of lock member 14, which projections are guided by grooves 16b in support member 16a. Guide post 16c extends upwardly from central area of the support member 16a, over which coil spring 17 is located. Lock member 14 is mounted over coil spring 17, which exerts an upward biasing force when lock member 14 is held in an assembled position, that is, so that upward displacement is limited, by means of catches 16d formed on guide post 16c. As shown in FIG. 2, lock member 14 is provided with three upwardly extending engaging protrusions 18 that are inserted into drive holes provided in the hub of the take-up reel of the cassette when the cassette is placed into the case. In this manner the reel is prevented from turning and tape spillage is prevented.

Lock member 15 is mounted over support member 20 similar to support member 16a described hereinabove. Lock member 15 is biased upwardly from support member 20 by means of coil spring 21 but, instead of being held in an assembled position by means of catches in the top portion of a centrally disposed post 22, member 15 is held by reel lifter 24. Reel lifter 24 is mounted over post 22 and biased upwardly by means of coil spring 25, but is held so that upward displacement is limited by means of catches 22a in top of the post 22. Lock member 15 is biased upwardly so that reel lifter 24 rests in recess 26 in lock member 15. Protrusions 27 project outwardly in a similar way to protrusions 18 from lock member 14. Protrusions 27 pass through cut-outs in reel lifter 24 so that when a cassette is placed into the case, the hub of the supply reel is lifted, engaged and prevented from rotating by protrusions 27.

Figure 1:
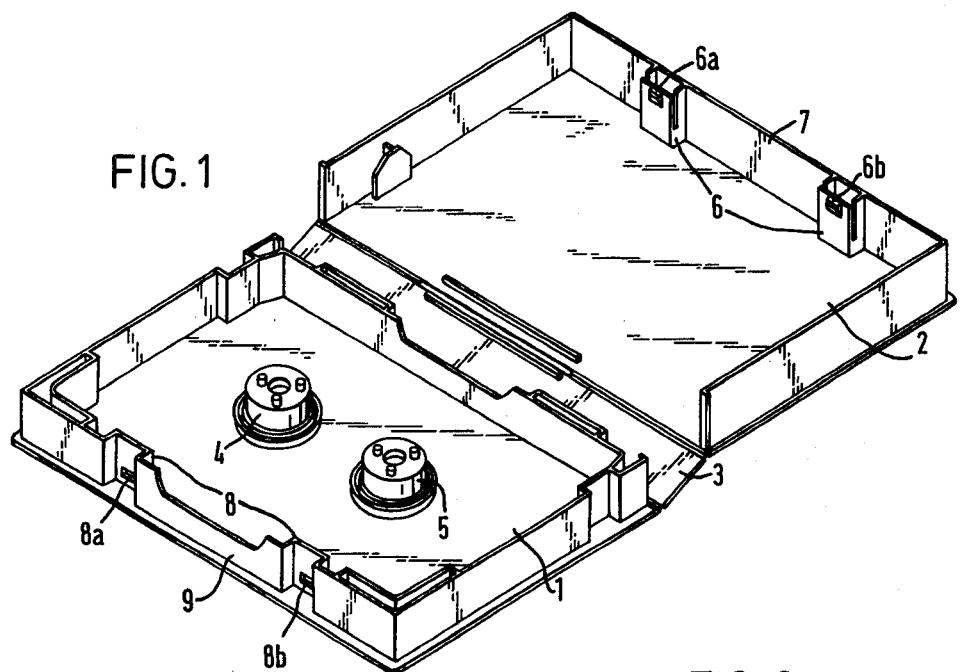
FIG. 1 is a perspective view of a tape cassette case known in the art.
Figure 3:
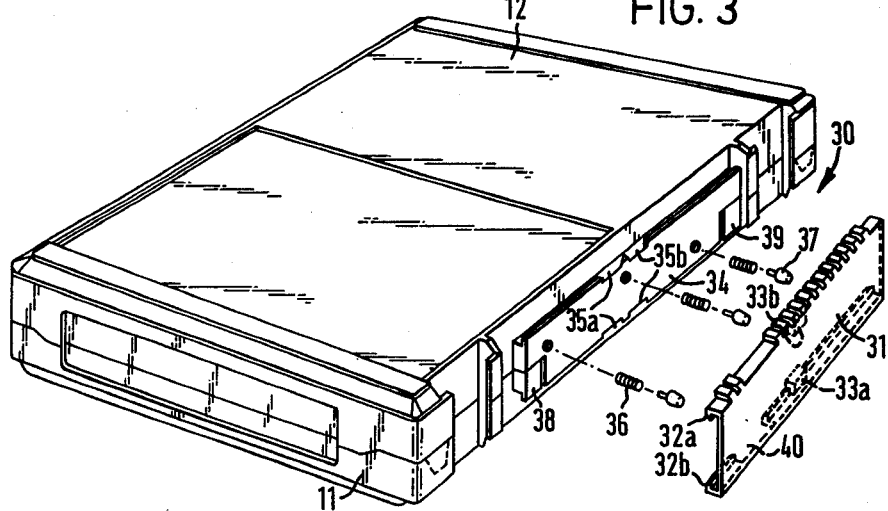
FIG. 3 is a perspective view of the tape cassette case of FIG. 2, in a closed position, also showing an exploded view of the locking means.

Locking means 30 will now be described with reference to FIGS. 2 and 3. Locking means 30 comprises slider member 31 having a pair of flanges 32a and 32b, that extend along the periphery of sides of slider member 31, which are parallel to a sliding direction of the locking mechanism, and posts 33a and 33b extend from flanges 32a and 32b, respectively. As can be seen from FIG. 3, flanges 32a and 32b are engageable with the periphery of support member 34 so that slider member 31 is slidable thereon. Support member 34 has two pairs of cut-outs 35a and 35b that receive posts 33a and 33b when the case is in an unlocked and locked state, respectively. The lengths of slider member 31 and support member 34 in the sliding direction are the same, and when the case is in a closed and locked state, posts 33a and 33b are aligned with cut-outs 35b, and they are inserted through cut-outs 35b because slider member 31 is biased away from support member 34 in a direction perpendicular to the sliding direction by means of coil springs 36. Similarly, when the case is in an unlocked or open state, posts 33a and 33b are aligned with, and inserted through, cut-outs 35a. One end of coil springs 36 abut against the peripheral wall of the case, and the other ends of coil springs 36 abut against slider member 31 via pins 37 made from a wear resistant material, for example, polystyrene. When the case is in a closed state, it can be seen from FIG. 3 that projections 38 and 39 projecting from the other peripheral wall, so as to be aligned with support member 34, are prevented from separating from support member 34 because they are obstructed by flange 32b of slider member 31, thus, the case is locked.

In order to open the case, it is necessary to separate main wall 11 and the cover wall 12 by opening them outwardly about the hinge means at the back wall 13. This is done by separating projecting members 38 and 39 away from support member 34, but to do this, slider member 31 must be pushed against the biasing direction of springs 36 thereby disengaging posts 33a and 33b from cut-outs 35b (see FIG. 4A and FIG. 4B), and then sliding slider member 31 so that posts 33a and 33b move towards cut-outs 35a. By releasing slider member 31, coil springs 36 cause slider member 31 to be biased away from support member 34, thereby causing posts 33a and 33b to be inserted into cut-outs 35a. Hence, slider member 31 is locked in an open position, and projection 38 is now aligned with cut-out 40 in flange 32b of slider member 31, and projecting member 39 is exposed beyond end of the flange 32b so that projections 38 and 39 may now be separated from support member 34, thereby permitting the case to be opened. The insertion of posts 33a and 33b into cut-outs 35b and 35a, respectively, provides a lock securing means, whereby slider member 31 of the locking means is only slidable between the open position and the closed position when it is pushed in a direction opposite to the biasing direction. The lock securing means significantly reduces the possibility of the tape cassette case opening accidently or inadvertently, and so the safety of the cassette placed therein is secured.

Referring back to FIG. 2, an additional locking means is provided on the peripheral walls of main wall 11 and cover wall 12. The additional locking means comprises a pair of rectangular shaped finger portions 50a and 50b each having a respective projection 50c or 50d formed thereon, and corresponding apertures 51a and 51b each formd in a recess in peripheral wall of main wall 11. When main wall 11 and cover wall 12 are brought together, finger portions 50a and 50b slide over the recessed portions of the peripheral wall of main wall 11, so that, when the case is closed, projections 50c and 50d of rectangular shaped finger portions 50a and 50b are inserted into apertures 51a and 51b, respectively, of the recessed portions respectively respectively. The additional locking means provides a way of maintaining good contact between the peripheral walls of main wall 11 and cover wall 12, and guides them into proper mating with one another when the case is closed.

FIG. 5 shows a side elevation in cross section of interlocking shoulders provided on the peripheral walls of main wall 11 and cover wall 12. Along the edge of the peripheral wall of main wall 11 there is shoulder 52a which meets shoulder 52b of the cover wall 12 when the case is closed. Shoulders 52a and 52b abut one another, thereby forming an effective seal between main wall 11 and cover wall 12 when the case is closed.

FIG. 6 shows a perspective view of the case when it is closed, and illustrates a pair of guide members 53a and 53b located adjacent to locking means 30. Guide members 53a and 53b comprise channels 54a and 54b, respectively, which pass through the peripheral walls of main and cover walls 11 and 12. Guide members 53a and 53b are moulded integrally with the peripheral walls, so that a rail may pass through each, thereby enabling the tape cassette to be secured to the rails of a transporting apparatus.

FIG. 7 shows a transporting apparatus 55, comprising a pair of side rails 56 and 57 that can slide into the channels 54a and 54b of the guide members 53a and 53b, respectively. Side rails 56 and 57 are of such thickness and width that they can support the tape cassette case via guide members 53a and 53b. In this manner a plurality of cases can be stacked, one on top of the other, onto the transporting apparatus 55, thus enabling a plurality of cassettes in their cases to be transported conveniently. The transporting apparatus 55 comprises a handle, for example, chain 58, removably attached to the side rails 56 and 57, which provides a means for lifting transporting apparatus 55.

As can be seen from FIG. 6, outside surface of the cover wall 12 is provided with strips 60, 61 having ridges 60a, 61a, respectively. The corresponding surface of main wall 11 is provided with recesses (not shown) which correspond in size and location to strips 60, 61 and ridges 60a, 61a so that when the cases are stacked, one on top of the other, respective surfaces of main wall 11 and cover wall 12 interlock with one another, thereby preventing the stacked tape cases from sliding relative to one another. Also, there are provided recesses 62 and 63 in cover wall 12 and peripheral walls respectively into which identification labels may be affixed without obstructing the stacking of the tape cassette cases.

Although illustrative embodiments of the invention have been described in detail herein with reference to the accompanying drawings, it is to be understood that the invention is not limited to those precise embodiments, and that various changes and modifications can be effected therein by one skilled in the art, without departing from the scope and spirit of the invention as defined by the appended claims.

I claim:

1. A tape cassette case for storing a cassette having a tape, said tape cassette case comprising:
   a main wall and a cover wall each having a periphery, and peripheral walls which extend from at least part of said periphery of each of said main and cover walls, said walls being closable to form an enclosure defined by said main wall, said cover wall and said peripheral walls;
   hinge means forming a back wall, and connecting a part of said periphery of said main wall to part of said periphery of said cover wall;
   locking means disposed on said peripheral walls of said main wall and said cover wall at a location opposite said hinge means, said locking means comprising a rigid sliding member which is mounted on one of said peripheral walls for slidable movement in a predetermined path between two end positions and being bodily displaceable in directions transverse to said predetermined path, spring means disposed between said rigid slider member and said one peripheral wall for biasing said rigid slider away from said one peripheral wall in a direction transverse to said predetermined path, securing means operably connected to said rigid slider member for preventing sliding motion of said rigid slider in said predetermined path at both said two end positions thereof, said securing means, said spring means, and said rigid slider member cooperating such that said rigid slider member at either of said two end positions is slidable in said predetermined path only when said rigid sliding member is bodily displaced in a direction transverse to said predetermined path and at least one member projecting from the other of said peripheral walls, so that when said case is closed, said rigid sliding member can be bodily displaced in said direction transverse to said predetermined path and slidably moved in said predetermined path to one of said two end positions to engage with said projecting member, thereby locking said main wall and said cover together, said rigid sliding member also being bodily displaceable in said direction transverse to said predetermined path and slidably movable in said predetermined path to the other of said two end positions to disengage said rigid slider member from said projecting portion, thereby allowing said case to be opened.

2. A tape cassette case according to claim 1; wherein said slider member is mounted on a support member which forms part of said one peripheral wall, said slider member being constrained to be slidable on said support member by means of a pair of flanges cooperating with said support member, said flanges forming an integral part of, and extending along the periphery of, said slider member in said sliding direction.

3. A tape cassette case according to claim 1; wherein an additional locking means is provided on said peripheral walls of said main wall and said cover wall, said additional locking means comprising, a rectangular finger, projecting from one of said peripheral walls and having a projection formed thereon, said finger being arranged for sliding over a recessed portion in said other peripheral wall when said case is closed, so that the projection of said finger is inserted into an aperture in said recessed portions on closing said case.

4. A tape cassette case according to claim 3, wherein said additional locking means is provided at two respective locations on the peripheral walls of both said main wall and said cover wall, each of said two respective locations being opposite to a respective end of said back wall.

5. A tape cassette according to claim 1; further comprising means for stacking, wherein a pair of guide members are provided on said peripheral walls of said case adjacent respective ends of said locking means, each of said guide members being able to receive a respective rail of said means for stacking, for securing together and transporting a plurality of tape cassette cases.

6. A tape cassette case according to claim 1, wherein edges of said peripheral walls are provided with shoulders, so that when said main and cover walls are brought together on closing said case, said shoulder of said main wall interlocks with said shoulder of said cover wall.

7. A tape cassette case according to claim 1; wherein opposite outside surfaces of said main and cover walls are provided with recesses and ridges located so that when said cases are stacked on top of one another, said recesses and ridges of said outside surface of said main wall and said cover wall of one case interlock with said recesses and ridges of said outside surface of said cover wall and said main wall, respectively, of adjacent cases in a stack.

8. A tape cassette according to claim 1; wherein said main wall of said cassette case has a take-up reel lock member and a supply-reel lock member extending from one face thereof.

9. A tape cassette case of the kind including at least two portions cooperating with a hinge for permitting opening and closing of the case and a latch preventing opening of the case in the closed position unless actuated, said latch comprising
   rigid slide means slidably movable in a predetermined path between first and second end positions and bodily displaceable in directions transverse to said predetermined path and being attached, opposite the hinge, to one of the two portions of the case;
   securing means actuatable between first and second positions and attached to said rigid slide means for cooperating with said bodily displacement of said rigid slide means in directions transverse to said predetermined path for securing said rigid slide means against motion in either said first or second end positions in said first actuatable position of said securing means and for releasing said rigid slide means and permitting motion thereof in said second actuatable position; and
   fixed means attached, opposite the hinge, to the other portion of the case and aligned with said rigid slide means, said rigid slide means and said fixed means cooperating such that in said first end position of said rigid slide means said rigid slide means and said fixed means are separable and in said second end position of said rigid slide means, said slide means and said fixed means are inseparable, whereby said securing means restricts free movement of said rigid slide means in said predetermined path in either of said first and second end positions unless said rigid slide means is bodily displaced in a direction transverse to said predetermined path.

10. A tape cassette case according to claim 9; wherein said fixed means comprises at least one projection member projecting from said other portion of the case for cooperating with said slide means.

11. A tape cassette case according to claim 9; wherein said slide means is mounted on a support member integrally formed with one of the two portions of the case, said slide means being slidably arranged on said support member and constrained between said two end positions by a pair of flanges cooperating with said support member.

12. A tape cassette case according to claim 9; wherein said securing means includes tab means formed on said slider means and apertures formed in said one of the two portions of the case to which said slide means is attached, said tab means cooperating with said apertures to prevent movement of said slide means.

* * * * *